United States Patent [19]
Mann

[11] Patent Number: 5,234,308
[45] Date of Patent: Aug. 10, 1993

[54] HINGED BED VEHICLE

[76] Inventor: Fred W. Mann, Box 444, Waterville, Kans. 66548

[21] Appl. No.: 734,540

[22] Filed: Jul. 23, 1991

Related U.S. Application Data

[63] Continuation-in-part of Ser. No. 485,211, Feb. 26, 1990, Pat. No. 5,033,931.

[51] Int. Cl.$^5$ .............................................. B60P 1/04
[52] U.S. Cl. .................................... 414/480; 414/469; 296/57.1; 296/61
[58] Field of Search ............... 414/485, 484, 483, 482, 414/469, 557, 472, 474, 476, 480, 555; 298/17 B, 17.5, 22 C, 22 D, 23 S, 23 A, 23 B; 280/400, 412, 414.5; 296/57.1, 61

[56] References Cited

U.S. PATENT DOCUMENTS

| | | |
|---|---|---|
| 1,434,168 | 10/1922 | Thornton . |
| 2,552,713 | 5/1951 | Flower . |
| 2,662,655 | 12/1953 | Sellers . |
| 2,696,928 | 12/1954 | Faircloth et al. . |
| 2,803,362 | 8/1957 | Saenz . |
| 3,064,842 | 11/1962 | Haynie . |
| 3,471,047 | 10/1969 | Burke . |
| 3,780,894 | 12/1973 | Holmes et al. ............... 414/485 |
| 3,799,373 | 3/1974 | Randall . |
| 3,968,892 | 7/1976 | Spars . |
| 4,046,274 | 9/1977 | Libersky ............... 414/485 |
| 4,101,081 | 7/1978 | Ritter et al. . |
| 4,222,698 | 9/1980 | Baelter . |
| 4,516,902 | 5/1985 | Matsou . |
| 4,630,991 | 12/1986 | Landall et al. . |
| 4,730,974 | 3/1988 | Andre . |
| 4,813,841 | 3/1989 | Eischen ............... 414/485 X |

FOREIGN PATENT DOCUMENTS 183345 7/1922 United Kingdom .

Primary Examiner—David H. Bollinger
Attorney, Agent, or Firm—Litman, McMahon & Brown

[57] ABSTRACT

A vehicle having a hinged bed with a hinge positioned such that a rear bed portion automatically pivots toward the ground in an inclined load/unload position when the vehicle is empty, forming a ramp for loading and unloading. The hinged bed automatically pivots to a horizontal transport position when a front portion of the bed is loaded. The vehicle includes a transport locking mechanism for securing the rear bed portion in its horizontal transport position and a separate load/unload locking mechanism for securing the rear bed portion in its inclined load/unload position. The vehicle includes embodiments comprising hydraulic pistons for converting the vehicle between a ramp-up, transport configuration and a ramp-down, load/unload configuration.

24 Claims, 7 Drawing Sheets

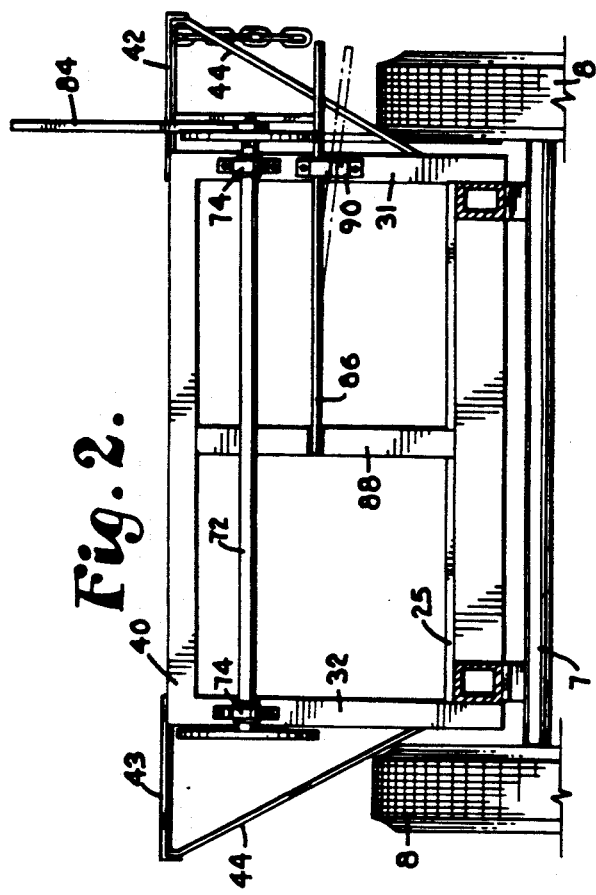
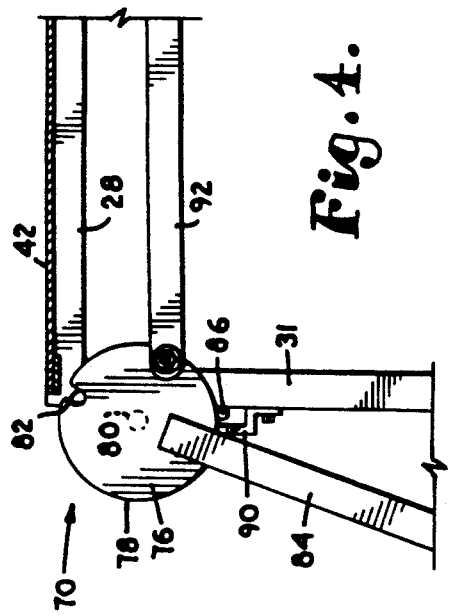
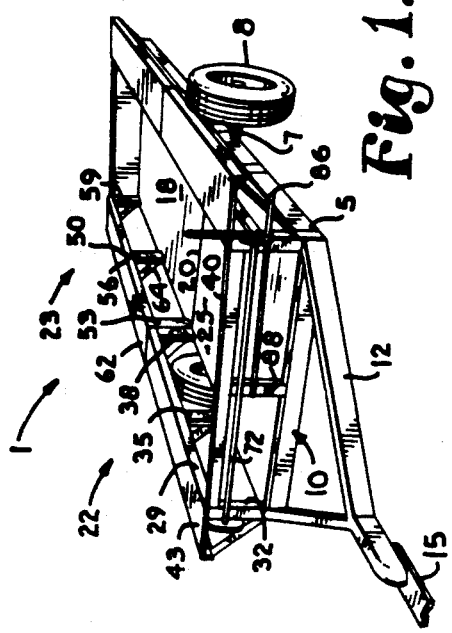
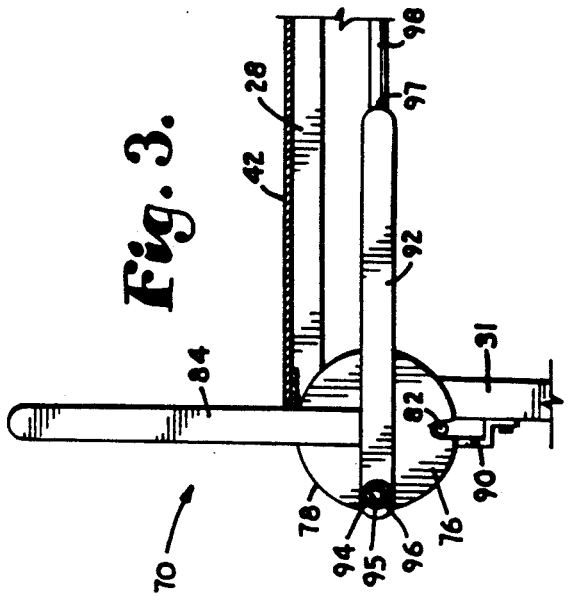

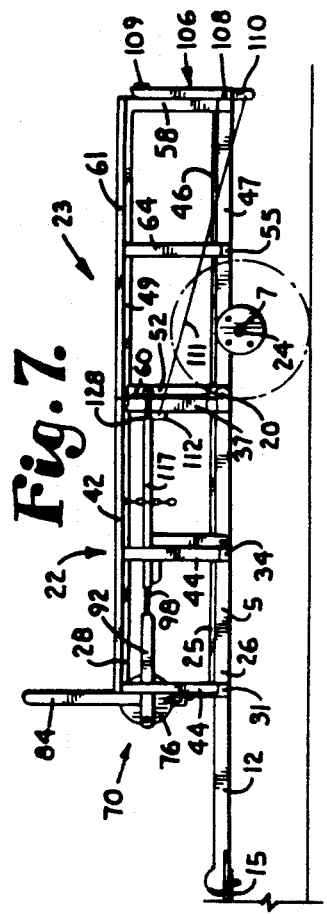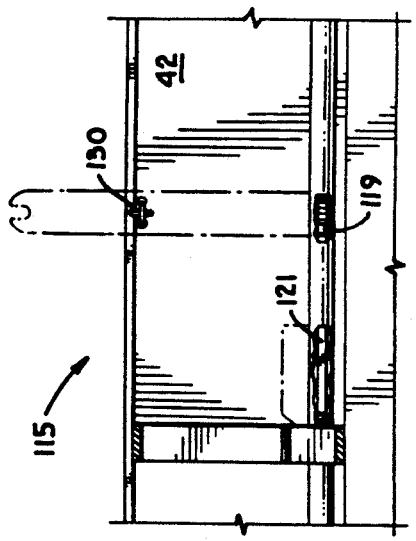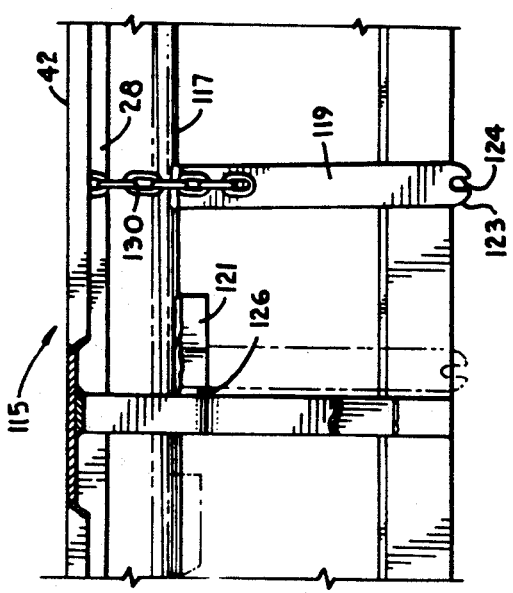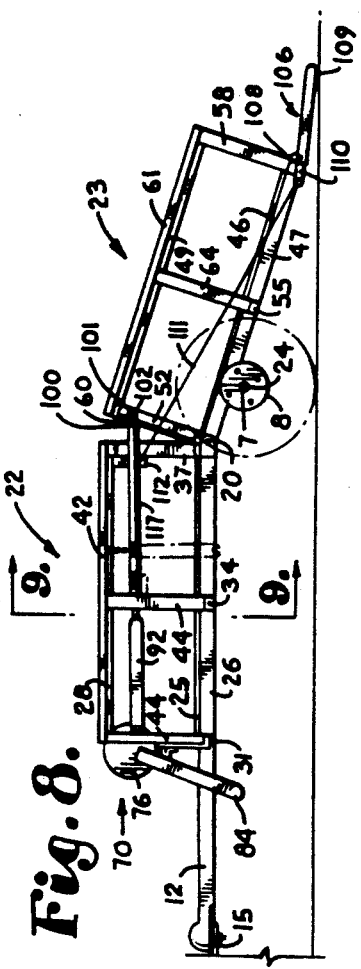

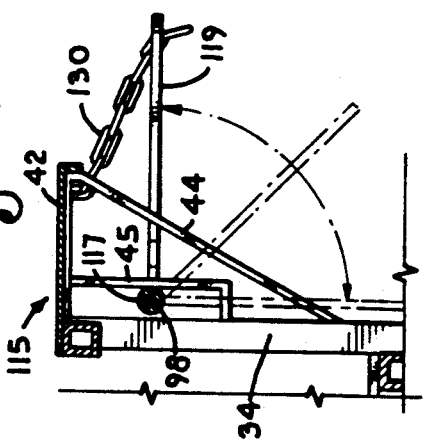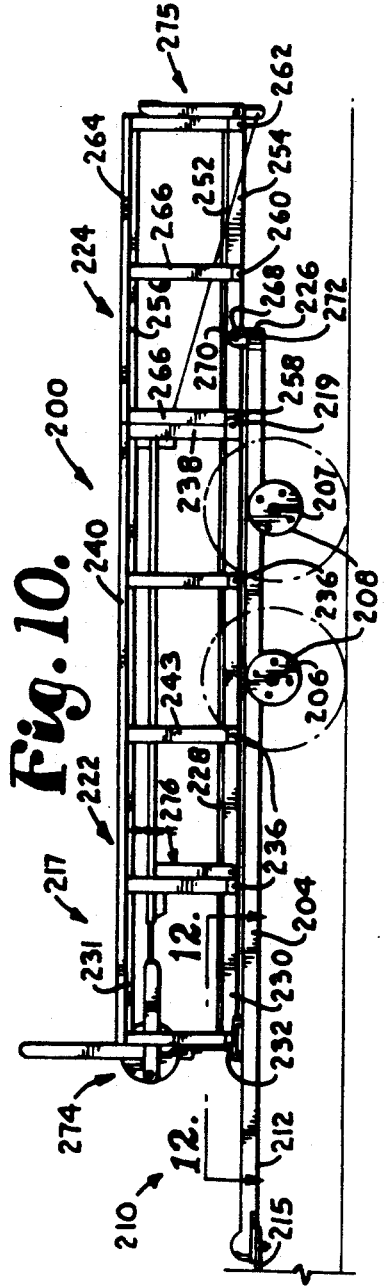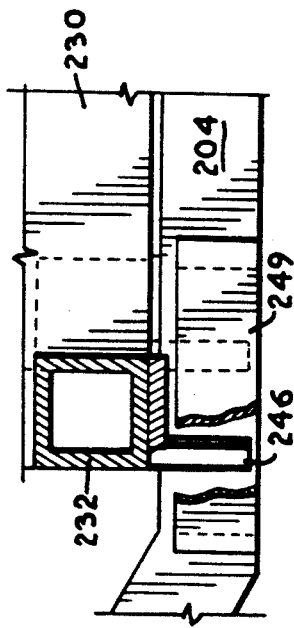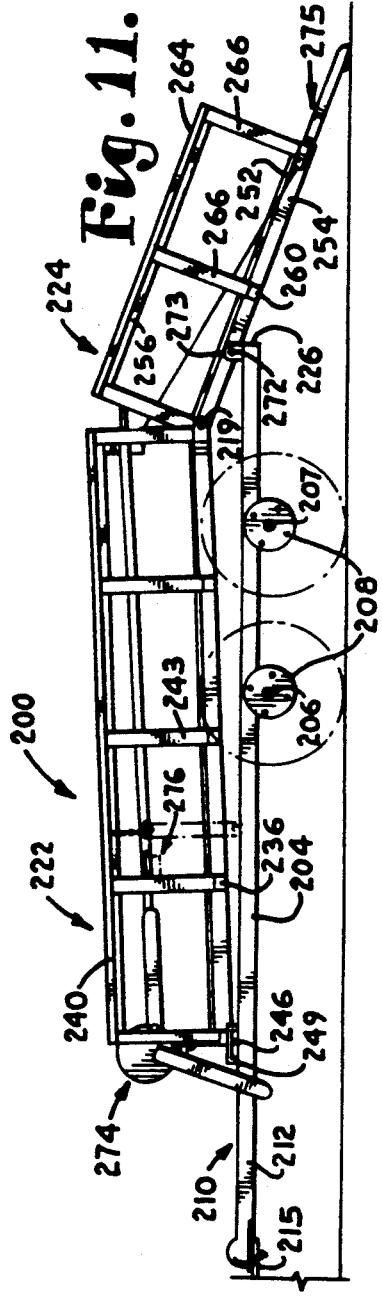

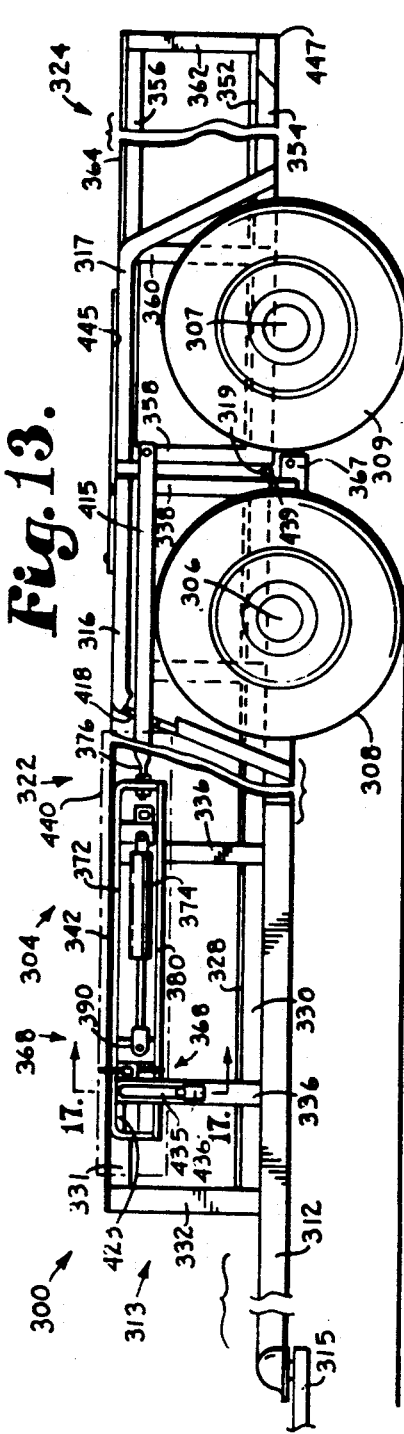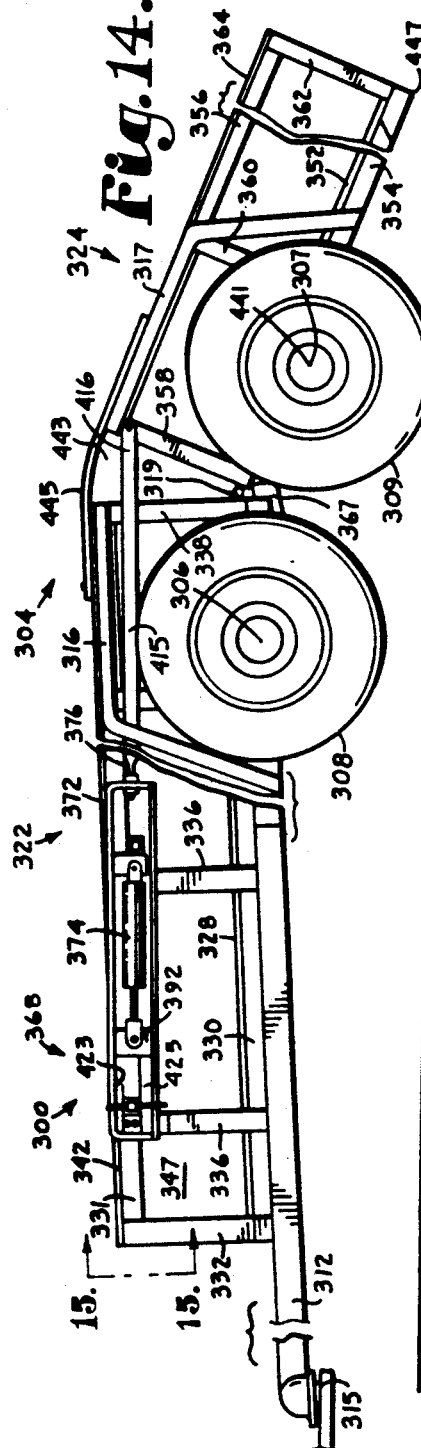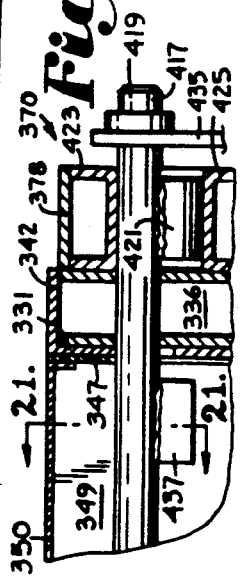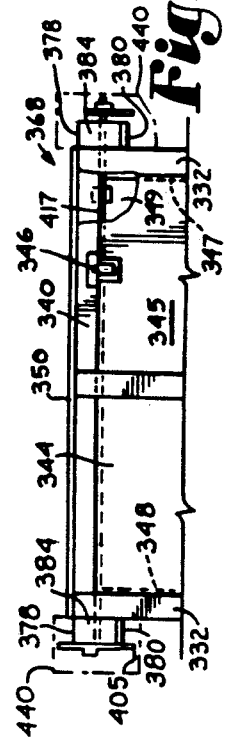

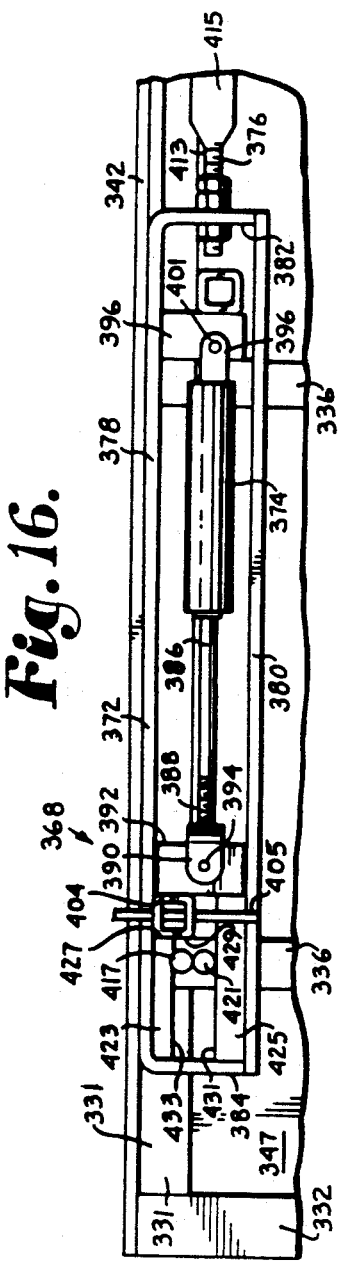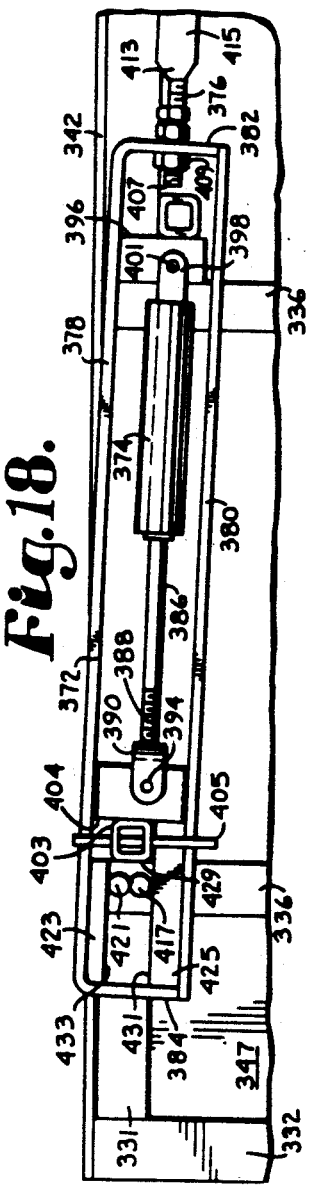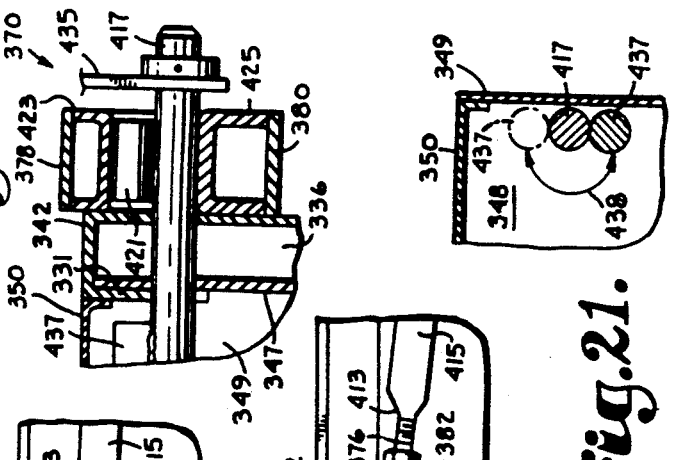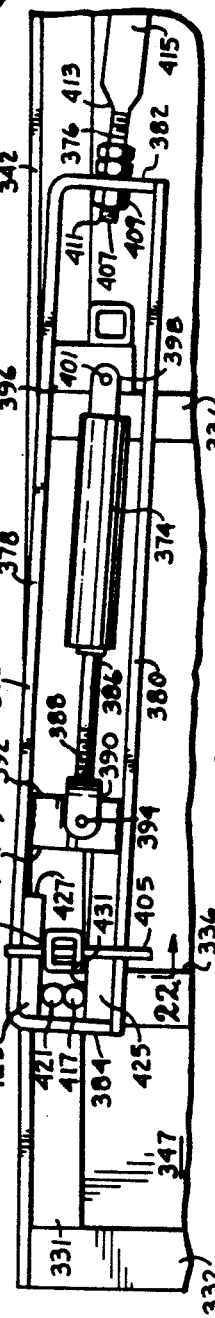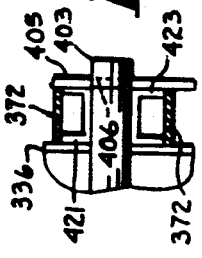

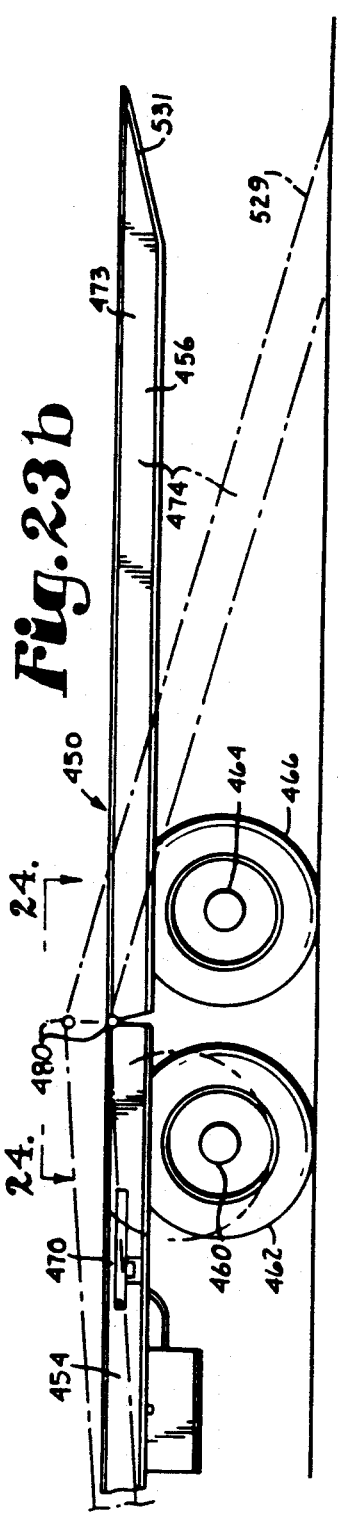
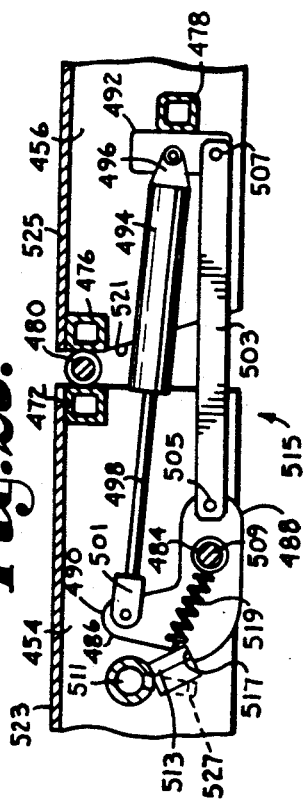
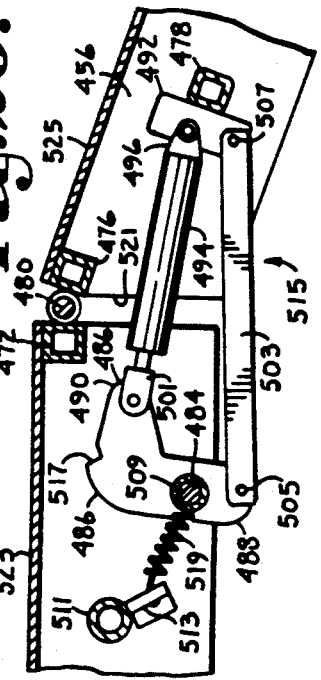
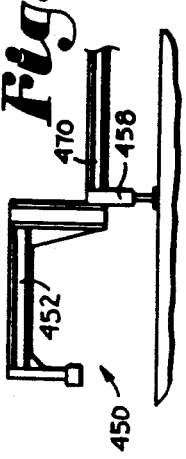
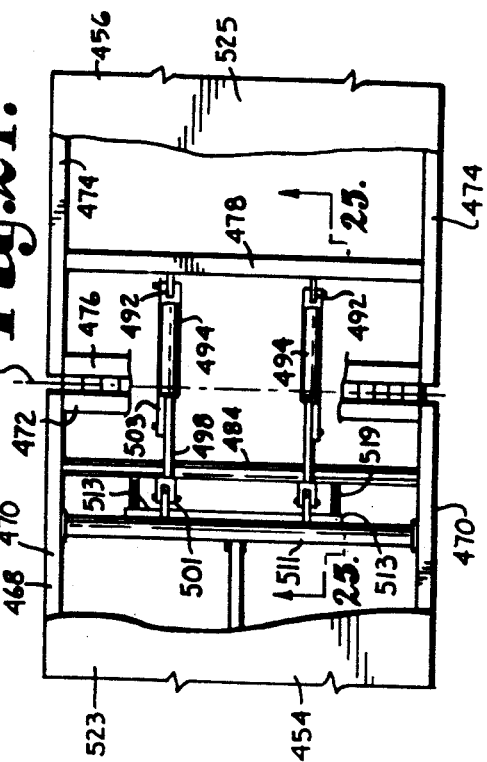

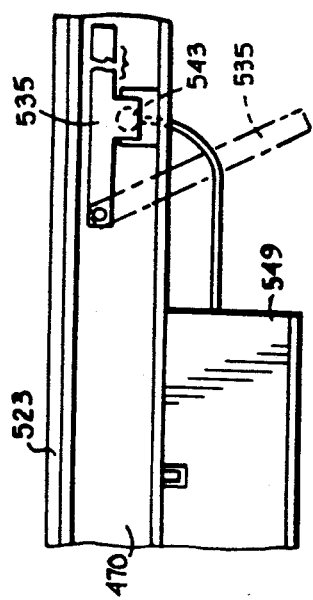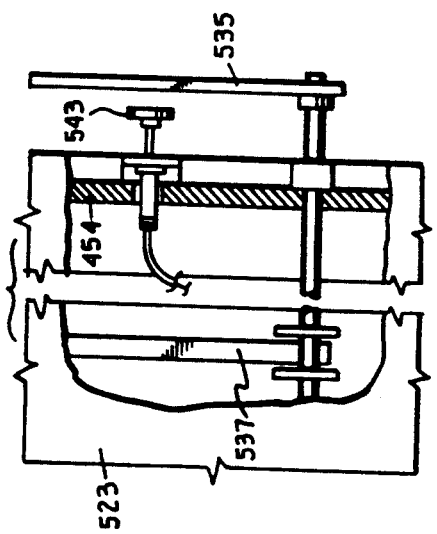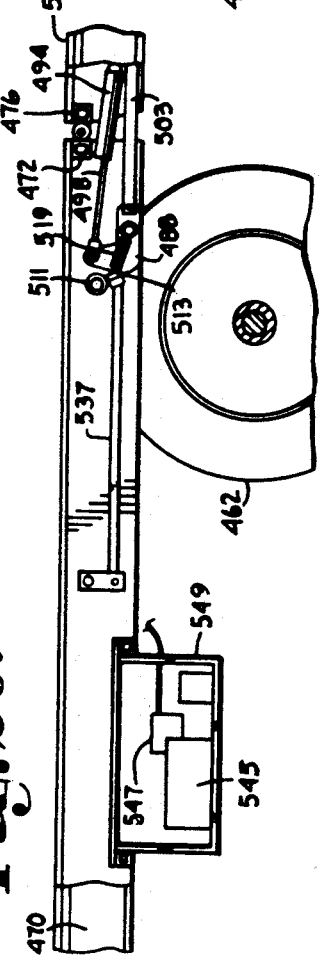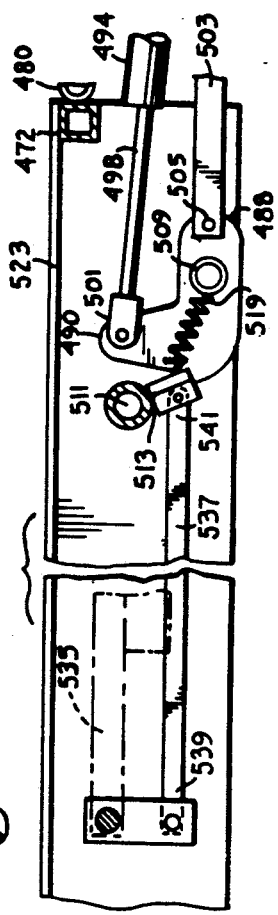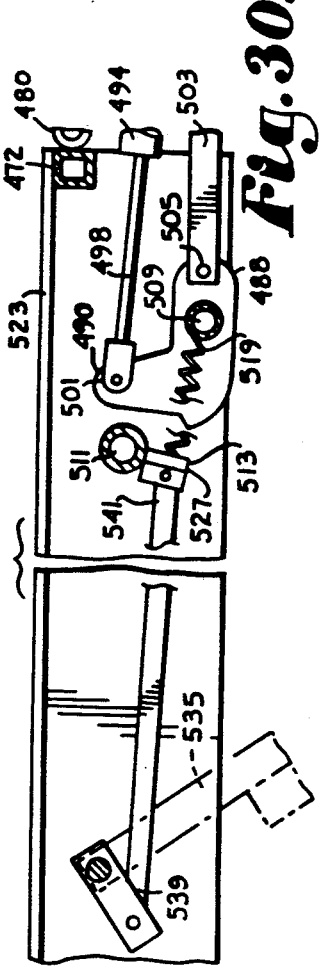

HINGED BED VEHICLE

CROSS-REFERENCE TO RELATED APPLICATION

This application is a Continuation-in-Part of application Ser. No. 485,211, filed Feb. 26, 1990 and issued Jul. 23, 1991 as U.S. Pat. No. 5,033,931.

BACKGROUND OF THE INVENTION

The present invention relates generally to vehicles and more particularly to an improved trailer having a hinged bed with a rear portion that pivots between load/unload and transport positions, facilitating equipment loading and unloading.

Trailers have long been used for transporting various loads, including equipment such as garden tractors, riding lawnmowers, motorcycles and the like. One type of trailer includes a tongue at the front for coupling with a tow truck o or car and a hinged or removable rear portion that forms a ramp to be used during the loading and unloading of the trailer. An operator loading a trailer with a hinged or removable ramp may have to first place the trailer in a ramp-down loading position, load the trailer (e.g. by driving equipment onto it) and then manually move the trailer ramp to a horizontal or vertical transport position. This is a time consuming process and the trailer ramp may be heavy and/or of an awkward size and therefore difficult for an operator to remove or adjust. Ramps for larger vehicles or trailers due to their massiveness, which is sometimes required in order to safely meet structural requirements needed for handling heavier and larger loads, may be difficult to manually manipulate.

The problems of manual trailer ramp adjustment have been addressed by winch and cable devices and by hydraulic cylinder and piston devices that connect to both a trailer bed and a hinged loading ramp and are adapted for pivoting the ramp between load/unload and transport positions. The prior art includes trailers utilizing such devices for automatically pivoting their loading ramps to transport positions when equipment to be transported is driven onto the trailer beds.

Winch and cable or hydraulic cylinder and piston devices can adequately pivot hinged trailer ramps between load/unload and transport positions without undue physical exertion by operators. However, trailers equipped with such devices, and particularly devices that provide automatic ramp adjustment, are often complex in design, adding to the expense of initial trailer purchase and trailer maintenance.

What is needed is an improved hinged bed vehicle having linear motor means, such as a hydraulic cylinder-and-piston arrangement, which is simple to operate and which efficiently overcomes the ramp difficulties posed by large trailers and vehicles.

SUMMARY OF THE INVENTION

In a preferred embodiment of the hinged bed vehicle of this invention, a bed includes a hinge positioned between a front end of the vehicle and a wheeled axle such that when the vehicle is empty, a rear portion of the bed behind the hinge is inclined toward the ground to form a ramp in a load/unload position. When weight is placed in front of the hinge on a front portion of the vehicle, the vehicle is assisted in returning to a horizontal transport position.

In a second embodiment, the hinged bed vehicle of this invention has a hinged bed mounted on a frame. A rear portion of the hinged bed is pivotally mounted on a rear end of the frame and a forward end of a front portion of the hinged bed is slidingly mounted onto the frame so as to slide forward as weight is placed on the front portion of the bed, pivoting the rear portion of the bed to a horizontal transport position.

The hinged bed vehicle of this embodiment of the invention is also equipped with two locking mechanisms: a first locking mechanism with a cam and a connecting rod for automatically securing the trailer in a transport position; and a second locking mechanism located on the connecting rod for securing the trailer in a load/unload ramp-down position for use when more than one piece of equipment is loaded onto or unloaded from the trailer.

A third embodiment and a fourth embodiment of the hinged bed vehicle provide a bed pivoting mechanism for converting the vehicle between a ramp-up transport configuration and a ramp-down load/unload configuration by a hydraulic piston arrangement. A locking mechanism locks the vehicle in a ramp-up, transport configuration and the piston in the hydraulic piston arrangement provides looking for the vehicle while in a ramp-down, load/unload configuration while loading and unloading the vehicle.

OBJECTS AND ADVANTAGES OF THE INVENTION

Therefore, the objects of the present invention are: to provide an improved hinged bed vehicle, particularly well adapted for transporting wheeled equipment; to provide such a vehicle that is not labor intensive; to provide such a vehicle that includes a ramp that automatically lowers to a loading position when the vehicle is empty and automatically pivots to a transport position when equipment is loaded onto the trailer; to provide such a vehicle that pivots quickly and efficiently between the loading and transport positions; to provide such a vehicle that is simple and inexpensive; to provide such a vehicle that safely transports equipment loaded thereon; to provide such a vehicle that includes a mechanism to lock the ramp in a transport position; to provide such a vehicle that includes a mechanism to lock the ramp in a load/unload position when more than one piece of equipment is to be loaded or unloaded thereon; and to provide such a vehicle that is relatively easy to use, inexpensive to construct and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of an embodiment of the hinged bed vehicle in accordance with the present invention including a front portion, a rear portion or ramp, a transport or ramp-up locking mechanism and a load/unload or ramp-down locking mechanism; the ramp is shown in a locked ramp-up position.

FIG. 2 is an enlarged front elevational view of the hinged bed vehicle with the ramp-up locking mechanism shown in a locked position in solid lines and in an unlocked position in phantom lines.

FIG. 3 is an enlarged fragmentary side elevational view of the hinged bed vehicle with the ramp-up locking mechanism shown in a locked position.

FIG. 4 is an enlarged fragmentary side elevational view of the hinged bed vehicle with the ramp-up locking mechanism is shown in an unlocked position.

FIG. 5 is an enlarged, fragmentary side elevational view of the hinged bed vehicle with the ramp-down locking mechanism shown in an unlocked load/unload ramp-down position in solid lines and a ramp-up position in phantom lines.

FIG. 6 is an enlarged, fragmentary, bottom plan view of the hinged bed vehicle with the ramp-down locking mechanism shown in an unlocked ramp-down position in solid lines and a locked ramp-down position in phantom lines.

FIG. 7 is a side elevational view of the hinged bed vehicle of this invention with the ramp shown in a transport position and the ramp-up locking mechanism shown in a locked position.

FIG. 8 is a side elevational view of the hinged bed vehicle of this invention with the ramp shown in a load/unload position and the ramp-down locking mechanism shown in a locked position in solid lines and an unlocked position in phantom lines.

FIG. 9 is an enlarged fragmentary cross-sectional view of the hinged bed vehicle with the ramp-down locking mechanism taken along 9—9 of FIG. 8 shown in a locked position in solid lines pivoting to an unlocked position in phantom lines.

FIG. 10 is a side elevational view of a second embodiment of the hinged bed vehicle with the ramp shown in a transport position and the ramp-up locking mechanism in a locked position.

FIG. 11 is a side elevational view of the second embodiment of the hinged bed vehicle with the ramp shown in a load/unload position with the ramp-down locking mechanism in a locked position in solid lines and in an unlocked position in phantom lines.

FIG. 12 is an enlarged fragmentary cross-sectional view of the second embodiment of the hinged bed vehicle taken along 12—12 of FIG. 10.

FIG. 13 is a side elevational view of a third embodiment of a hinged bed vehicle, according to the present invention, with a ramp shown in a transport position.

FIG. 14 is a side elevational view of the third embodiment of the hinged bed vehicle with the ramp shown in a load/unload position.

FIG. 15 is a fragmentary, front elevational view of the third embodiment of the hinged bed vehicle, taken generally along line 15—15 of FIG. 14, with portions cut away to reveal details thereof.

FIG. 16 is an enlarged and fragmentary view of a ramping mechanism of the third embodiment of the hinged bed vehicle, showing a locking mechanism in a ramp-up, locked configuration.

FIG. 17 is an enlarged and fragmentary, cross-sectional view of the locking mechanism of the third embodiment of the hinged bed vehicle, taken generally along line 16—16 of FIG. 13, showing the locking mechanism in the ramp-up, locked configuration.

FIG. 18 is an enlarged and fragmentary view of the bed pivoting mechanism of the third embodiment of the hinged bed vehicle, showing the locking mechanism in a ramp-up, unlocked configuration.

FIG. 19 is an enlarged and fragmentary, cross-sectional view of the locking mechanism of the third embodiment of the hinged bed vehicle, showing the locking mechanism in the ramp-up, locked configuration.

FIG. 20 is an enlarged and fragmentary view of the ramping mechanism of the third embodiment of the hinged bed vehicle, showing the locking mechanism in a ramp-down configuration.

FIG. 21 is a further enlarged and fragmentary, cross-sectional view of the looking mechanism of the third embodiment of the hinged bed vehicle, taken generally along line 21—21 of FIG. 17.

FIG. 22 is an enlarged and fragmentary, cross-sectional end view of the locking mechanism of the third embodiment of the hinged bed vehicle, taken generally along line 22—22 of FIG. 20, showing a retainer rod.

FIG. 23a is a fragmentary, side-elevational view of a fourth embodiment of a hinged bed vehicle, according to the present invention, showing a gooseneck configuration.

FIG. 23b is an enlarged, fragmentary, side-elevational view of the fourth embodiment of the hinged bed vehicle showing a ramp in a transport position in solid lines and in a load/unload position in phantom lines.

FIG. 24 is a fragmentary, enlarged, top plan view of the fourth embodiment of the hinged bed vehicle, taken generally along lines 24—24 of FIG. 23b, showing portions cut away to reveal details thereof.

FIG. 25 is a further enlarged and fragmentary, side-elevational view of the fourth embodiment of the hinged bed vehicle, showing a bed pivoting mechanism in a locked configuration as a ramp is in a transport position in solid lines and in a similar but unlocked configuration in phantom lines, taken generally along line 25—25 of FIG. 24.

FIG. 26 is a further enlarged and fragmentary, side-elevational view of the fourth embodiment of the hinged be vehicle, showing the bed pivoting mechanism as the ramp is in a load/unload position, according to the present invention.

FIG. 27 is an enlarged and fragmentary, side elevational view of the fourth embodiment of the hinged bed vehicle, showing a disengagement lever in a locking configuration in solid lines and in a disengaged configuration in phantom lines.

FIG. 28 is an enlarged and fragmentary, side elevational view of the fourth embodiment of the hinged bed vehicle, showing portions cut away to reveal details thereof.

FIG. 29 is a further enlarged and fragmentary, side elevational view of the fourth embodiment of the hinged bed vehicle, showing a disengagement linkage in the locking configuration.

FIG. 30 is a further enlarged and fragmentary, side elevational view of the fourth embodiment of the hinged bed vehicle, similar to FIG. 29 but showing the disengagement linkage in the disengaged configuration.

FIG. 31 is a further enlarged and fragmentary, top plan view of the disengagement lever and a motor control, according to the present invention, with portions cut away to reveal details thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

I. First Embodiment

Referring to the drawings in detail and particularly to FIGS. 1 through 9, a hinged bed vehicle of this invention, generally designated by the reference numeral 1, includes a frame 5 mounted on an axle 7 having a pair of wheels 8 and extending at a front or forward end 10 to a tongue 12 for coupling with a towing vehicle such as a truck (not shown) having a hitch 15. It is foreseen that the trailer 1 may also be part of a vehicle such as a truck bed. The frame 5 supports an elongated bed 18. Pivoting means along a transverse axis such as illustrated by a hinge 20 located between the forward end of the frame 10 and the axle 7 separates the trailer 1 into a front portion 22 and a rear or ramp portion 23 with the rear portion 23 pivotal about a transverse axis 24 located in the center of axle 7.

The front portion 22 includes a first or front bed portion 25 mounted on a lower frame 26. A pair of longitudinally extending side rails 28 and 29 located above the front bed portion 25 and parallel to the sides of the lower frame 26 are fixedly connected to and supported by a framework including a pair of front support braces 31 and 32, middle support braces 34 and 35, and rear support braces 37 and 38 that are perpendicular and fixedly connected to the lower frame 26. The rear support braces 37 and 38 are located near hinge 20. A horizontal top cross bar 40 supports and connects front support braces 31 and 32 to each other. A pair of longitudinally extending guard rails 42 and 43 are fixedly mounted on the side rails 28 and 29 respectively and extend substantially along the length thereof and are supported by brackets 44 attached to the side rails 28 and 29 and to the lower frame 26 at locations where the lower frame 26 connects with support braces 31, 32, 34, 35, 37 and 38. An L-shaped bracket 45 is fixedly mounted to the outer surface of the middle support brace 34 and to the horizontal portion of one of the brackets 44.

Similarly, the rear or ramp portion 23 includes a second or rear bed portion or ramp 46 mounted on a lower frame 47. A pair of side rails 49 and 50 located above the bed portion 46 and parallel to the sides of the lower frame 47 are fixedly connected and supported by a framework including a pair of front support braces 52 and 53, a pair of middle support braces 55 and 56 and a pair of rear support braces 58 and 59 that are perpendicular and fixedly connected to the lower frame 47. The front support braces 52 and 53 of the rear portion 23 are located near the hinge 20. A plate 60 integral with support brace 52 extends laterally substantially along the length of the forward edge thereof. A pair of guard rails 61 and 62 are fixedly mounted on the side rails 49 and 50 respectively and extend substantially along the length thereof and are supported by brackets 64 attached to the side rails 49 and 50 and the lower frame 47 at locations where the lower frame 47 connects with support braces 52, 53, 55, 56, 58 and 59.

A ramp-up cam lock mechanism, generally represented by the reference numeral 70, includes a horizontal cam shaft 72 slidingly mounted by brackets 74 to both front support braces 31 and 32 at the front end 10 of the trailer 1 near the top cross bar 40. A cam plate 76 having an outer radial surface 78 is fixedly connected to the cam shaft 72 at the center 80 thereof and located on the outer side of front support brace 31. The cam plate 76 has a U-shaped notch 82 located on the outer radial surface 78 and a lever 84 fixedly connected thereto extending radially opposite the notch 82. A transverse looking rod or bar 86 located generally below the cam shaft 72, fixedly connected to a central vertical support 88 extends through a support bracket 90 located on the front support bar 31 and the notch 82 restricting the rotation of the cam plate 76 and the cam shaft 72. The central vertical support 88 is fixedly connected to both the lower frame 26 and the top cross bar 40. The support bracket 90 does not hamper vertical movement of the semi-flexible rod 86 allowing manual adjustment of the rod 86 between a position lodged in the notch 82 and a position below the radial surface 78 of the cam plate 76 as shown in FIG. 2, so as to allow rotation of the cam plate 76.

A bar 92 is pivotally mounted on a bolt 94 extending through an aperture 95 on the cam plate 76 at a location near the radial outer surface 78 between the U-shaped notch 82 and the lever 84 and secured by a lock nut 96. The bar 92 is fixedly attached at an end 97 to a cam rod 98 that extends substantially longitudinally along the front portion 22 of the trailer 1 and slidingly through the L-shaped bracket 45 and an aperture 100 in the plate 60 of the rear portion 23 of the trailer 1. The inner diameter of the aperture 100 is substantially larger than the outer diameter of the cam rod 98 to compensate for the angular movement of both the plate 60 and the cam rod 98. A lock nut 101 secured to the end 102 of the cam rod 98 is adapted to keep the cam rod 98 positioned in the aperture 100.

A tailgate mechanism 106 located at the rear or back end of the trailer 1 and pivotally connected to the lower frame 47 by a hinge 108 includes a bumper 109 fixedly attached thereto and a member 110 integral thereto extending below the lower frame 47 when the tailgate 106 is in a nearly vertical position. Linkage means located to one side of the trailer 1 such as illustrated by a rod 111 is pivotally attached to the tailgate member 110 and pivotally attached to a plate 112 fixedly attached to the rear support brace 37 of the front portion 22 of the trailer 1 thereby cooperating the tailgate mechanism 106 with the front portion 22. The length of the rod 111 is adapted such that the tailgate 106 pivots between a near vertical position adjacent to rear support members 58 and 59 when the rear portion 23 of the trailer 1 is in the horizontal transport position as shown in FIG. 7 and a slightly inclined position with the bumper 109 resting on the ground when the rear portion 23 of the trailer 1 is in a load/unload position as shown in FIG. 8.

A ramp-down locking mechanism, generally represented by the reference numeral 115 includes a cylindrical sleeve 117 surrounding a substantial portion of the cam rod 98 and slidable thereon. Fixedly attached to the sleeve 117 are a handle or lever 119 and a stop plate 121 located substantially near to each other and projecting radially from the sleeve 117 in the same direction, hanging vertically down therefrom when the ramp-down locking mechanism 115 is in an unlocked position. The end 123 of the lever 119 contains a groove 124. The stop plate 121 is trapezoidal in shape having a slanting forward edge 126. The stop plate 121 is located such that when the trailer 1 is in a load/unload position as illustrated in FIG. 8, and the sleeve 117 is manually slid along the cam rod 98 until an end 128 of the sleeve 117 abuts against the plate 60 on the rear portion 23, and the lever 119 and the stop plate 121 are manually rotated to a horizontal position, the forward edge 126 of the stop plate 121 abuts or wedges against the rearward edge of the L-shaped bracket 45. A locking means such as illustrated by a chain 130 is fixedly attached to the guard rail 42 hanging vertically therefrom and adapted to engage the groove 124 in the lever 119 when the lever is in a horizontal position, locking the trailer 1 in the load/unload ramp-down position as shown in FIG. 9.

In operation, the trailer 1 of this invention is used with a towing vehicle, such as a truck or tractor and most often used for transporting small equipment such as garden tractors and riding lawnmowers. If the trailer 1 is in the ramp-up locked position as shown in FIGS. 1 and 7, an operator must manually unlock the ramp-up cam lock mechanism 70 shown in detail in FIGS. 3 and 4 by pushing down on the horizontal locking rod 86 and unlodging it from the cam plate notch 82. The lever 84 can then be used to easily rotate the cam plate 76 in a counter-clockwise direction, pressing the cam rod 98 against the plate 60 on the rear portion 23. The rear portion 23 freely pivots down about the transverse axis 24 to a loading position due to the weight thereof, rotating the cam-lock mechanism 70 to the position shown in FIG. 4. The pivoting of the rear portion 23 pulls the rod 111 forward which in turn pulls forward on the member 110 of the tailgate 106 pivoting the tailgate 106 to a position inclined toward the ground. A hydraulic piston and cylinder unit (not shown) may be connected to the front portion 22 and the rear portion 23 of the trailer 1 in order to control the speed of movement of the rear portion 23 to the ramp-down loading position.

When the trailer 1 is in the loading position shown in FIG. 8, an operator may drive or otherwise load the equipment onto the trailer. As the equipment passes over the hinge 20 and onto the front bed portion 25, the weight of equipment causes the front portion 22 to lower and the rear portion 23 to pivot about the transverse axis 24 to a horizontal position with the front support braces 52 and 53 of the rear portion 23 abutting against the rear support braces 37 and 38 of the front portion 22. As the rear portion 23 pivots to a horizontal position, the cam rod 98 is pushed forward, rotating the cam plate 78 in a clockwise direction until the horizontal locking rod 86, automatically slides into the notch 82, locking the trailer 1 into the transport position. The pivoting of the rear portion 23 pushes the rod 111 rearward which in turn pushes the member 110 of the tailgate 106 in a rearward direction causing the tailgate 106 to pivot to a vertical position. As with the ramp-down movement to the loading position, a hydraulic piston and cylinder unit (not shown) may be utilized to control the speed of the movement of the rear portion 23 to the horizontal transport position.

If more than one piece of equipment is to be loaded onto the trailer 1, the rear portion 23 may be locked into the loading position by use of the ramp-down locking mechanism shown in FIGS. 5, 6 and 9. An operator must first slide the sleeve 117 toward the rear portion 23 until the end 128 of the sleeve 117 abuts against the plate 60. The operator then rotates the handle 119 from a vertical position to a horizontal position shown in FIG. 9 causing the forward edge 126 of the stop plate 121 to wedge against the rearward edge of the L-shaped bracket 45, locking the rear portion 23 in the loading position. The operator may then slide the chain 130 into the groove 124 in the handle 119 to hold the handle 119 in the horizontal locked position. After the last piece of equipment is loaded, the operator disengages the chain 130 from the handle 119 and lowers the handle 119 to a vertical position. The lower portion 23 then automatically pivots to a transport position, rotating the cam plate 76 until the horizontal locking rod 86 slides into the notch 82.

When unloading equipment, the procedure is reversed and the operator must first disengage the locking rod 86 from the notch 82 by pushing down on the rod 86. As the equipment crosses over the hinge 20, the rear portion 23 automatically pivots to a ramp-down unloading position. If more than one piece of equipment is to be unloaded, the ramp-down locking mechanism 115 may be utilized to keep the rear portion 23 from returning to a horizontal transport position after the first piece of equipment is unloaded. To convert an empty trailer 1 from a load/unload position to a transport position, an operator may rotate lever 84 in a clockwise direction, pulling cam rod 98 in a forward direction, pivoting the rear portion into the transport position.

II. Second Embodiment

A second embodiment of the hinged trailer of this invention, generally designated by the reference numeral 200 is shown in FIGS. 10, 11 and 12. The trailer 200 includes a main frame 204 mounted on a pair of axles 206 and 207 each having a pair of wheels 208 and extending at a front or forward end 210 to a tongue 212 for coupling with a towing vehicle such as a truck (not shown) having a hitch 215. It is foreseen that the trailer 200 may also be part of a vehicle such as a truck bed. The main frame 204 supports a trailer bed unit, generally designated by the reference numeral 217 having a pivoting means along a transverse axis such as illustrated by a hinge 219 separating the unit 217 into a front portion 222 and a rear or ramp portion 224. The hinge 219 is generally located between the rear axles 207 and the rearward end 226 of the main frame 204 with the rear portion 224 generally pivotal about the rearward end 226.

The front portion 222 includes a first or front bed portion 228 mounted on a lower frame 230. A pair of longitudinally extending side rails 231 located above the bed 228 and parallel to the sides of the lower frame 230 are fixedly connected to and supported by a framework including a pair of front support braces 232, three pair of middle support braces 236 and a pair of rear support braces 238 that are perpendicular and fixedly connected to the lower frame 230. The rear support braces 238 are located near hinge 219. A horizontal top cross bar (not shown) similar to the horizontal top cross bar 40 of trailer 1, supports and connects front support braces 232 to each other. A pair of longitudinally extending guard rails 240 are fixedly mounted on the side rails 231 and extend substantially along the length thereof and are supported by brackets 243 attached to the side rails 231 and the lower frame 230 at locations where the lower frame 230 connects with support braces 232, 236 and 238.

A shaft 246 welded or otherwise fixedly attached to the front end of the lower frame 230 extending laterally from the base of each support brace 232 rests on the main frame 204 and is slidable thereon. The longitudinal sliding movement and the vertical movement of the shaft 246 is restricted by a C-shaped brace 249 fixedly mounted to the main frame 204 shown in FIG. 12. As will be described more fully in the following paragraphs, the brace 249 is positioned and sized to provide adequate space for the shaft 246 to slide to allow pivoting of the rear portion 224 between an inclined load/unload position and a horizontal transport position.

The rear portion 224 includes a second or rear bed portion or ramp 252 mounted on a lower frame 254. A pair of side rails 256 located above the bed portion 252 and parallel to the sides of the lower frame 254 are fixedly connected and supported by a framework including a pair of front support braces 258, a pair of middle support braces 260, and a pair of rear support braces 262 that are perpendicular and fixedly connected to the lower frame 254. The front support braces 258 are located near the hinge 219. A pair of guard rails 264 are fixedly mounted on the side rails 256 and extend substantially along the length thereof and are supported by brackets 266 attached to the side rails 256 and the lower frame 254 at locations where the lower frame 254 connects to support braces 258, 260 and 262.

A pair of rear portion supports 268 each having an aperture 270 are fixedly attached to the lower frame 204 at the rearward end 226 on each side of the trailer 200. Pivoting means such as bolts 272 slidingly extend through the apertures 270 and through apertures (not shown) located on each side of the lower frame 254 of the rear portion 224 positioned generally between the front support braces 258 and the middle support braces 260. The rear portion 224 is pivotable about a transverse axis 273 and supported by the bolts 272.

The second embodiment 200 of the trailer of this invention also includes a ramp-up cam lock mechanism generally represented by the reference numeral 274, a tail gate mechanism generally represented by the reference numeral 275 and a ramp-down locking mechanism generally represented by the reference numeral 276. The ramp-up cam lock mechanism 274, tailgate mechanism 275 and ramp-down locking mechanism 276 are identical to the respective ramp-up cam lock mechanism 70, tailgate mechanism 106 and ramp-down locking mechanism 115 of the first embodiment 1 of the invention. The front portion 222 and rear portion 224 of the second embodiment 200 are equipped with features identical to that described for front portion 22 and rear portion 23 of the first embodiment 1 in order to facilitate and support the ramp-up cam lock mechanism 274, tailgate mechanism 275 and ramp-down locking mechanism 276.

In operation, the trailer 200 of this invention is used with a towing vehicle, such as a truck or tractor and may be used for transporting large and small equipment. The operation of the cam lock mechanism 274, tailgate mechanism 275 and the ramp-down locking mechanism 276 are identical to the operations of the cam lock mechanism 70, tailgate mechanism 106 and the ramp-down locking mechanism 115 of the first embodiment 1 of the invention.

If the trailer 200 is in the ramp-up locked position as shown in FIG. 10, an operator must manually unlock the ramp-up cam lock mechanism 274. The rear portion 224 then freely pivots at bolts 270 about the transverse axis 273 to a position inclined toward the ground With the tailgate mechanism 275 touching the ground. As the rear portion 224 pivots between the horizontal and inclined positions, the trailer 200 bends at hinge 219 raising the front portion 222 and sliding the shaft 246 in a rearward direction on the main frame 204. If more than one piece of equipment is to be loaded or unloaded. The rear portion 224 may be locked into the inclined position by use of the ramp-down locking mechanism 276.

When the trailer 200 is in the loading position shown in FIG. 11, an operator may drive or otherwise load equipment onto the trailer. As the equipment passes over the hinge 219 and onto the front bed portion 228, the weight of the equipment causes the shaft 246 to slide forward, pivoting the rear portion 224 to a horizontal position and the tailgate mechanism 275 to a vertical position.

III. Third Embodiment

A third embodiment of a hinged bed vehicle or trailer in accordance with the present invention is shown in FIGS. 13 through 21 and is generally designated by the reference numeral 300. Many of the characteristics of the trailer 300 are substantially similar to those previously described for other embodiments described herein and will not be reiterated here in detail.

The trailer 300 includes a main frame 304 mounted on a pair of axles 306 and 307, each having a pair of wheels 308 and 309, respectively, and a tongue 312 extending forwardly from a front or forward end 313 for coupling with a towing vehicle such as a truck (not shown) having a hitch 315. The wheels 308 are generally partially covered by a pair of front fenders 316 fixedly secured to the front portion 322 and the wheels 309 are generally partially covered by a pair of rear fenders 317 fixedly secured to the rear portion 324, as shown in FIG. 13. It is foreseen that the trailer 300 may also be constructed in a goose-neck configuration or be part of a vehicle such as a truck bed.

The main frame 304 includes a hinge 319 separating the main frame 304 into a front portion 322 and a rear or ramp portion 324. The hinge 319 is generally located between the rear axles 306 and 307 with the rear portion 324 generally pivotal about the hinge 319 relative to the front portion 322.

The front portion 322 includes a first or front bed portion 328 mounted on a lower frame 330. A pair of longitudinally extending side rails 331 located above the bed 328 and parallel to the sides of the lower frame 330 are fixedly connected to and supported by a framework including a pair of front support braces 332, a plurality of paired middle support braces 336 and a pair of rear support braces 338 that are perpendicular and fixedly connected to the lower frame 330. The rear support braces 338 are located near hinge 319. A horizontal top cross bar 340 supports and connects front support braces 332 to each other. A pair of longitudinally extending guard rails 342 are fixedly mounted on the side rails 331.

An enclosed compartment 344 has a hinged front wall 345 with a latch 346, a pair of opposing side walls 347 and 348, a rear wall 349, a top wall 350 and a bottom wall (not shown).

The rear portion 324 includes a second or rear bed portion or ramp 352 mounted on a lower frame 354. A pair of side rails 356 located above the bed portion 352 and parallel to the sides of the lower frame 354 are fixedly connected and supported by a framework including a pair of front support braces 358, a pair of middle support braces 360, and a pair of rear support braces 362 that are perpendicular and fixedly connected to the lower frame 354. The front support braces 358 are located near the hinge 319. A pair of guard rails 364 are fixedly mounted on the side rails 356 and extend substantially along the length thereof.

The axles 306 and 307 are connected to the main frame 304 by an undercarriage 367 such that the axle 30 is spaced beneath the front portion 322 and forwardly from the hinge 319 and the axle 307 is spaced beneath the rear portion 324 and rearwardly from the hinge 319 by methods commonly known in the art.

The third embodiment 300 of the vehicle of this invention also includes bed pivoting means or ramping means, such as a bed pivoting or ramping mechanism generally represented by the reference numeral 368, and locking means, such as an opposing pair of locking mechanisms generally represented by the reference numeral 370.

The ramping mechanism 368 includes a pair of cradles 372, linear motor means such as a pair of hydraulic piston and cylinder units or rams 374, and a pair of transfer rods 376. Each of the cradles 372 has a cradle top wall 378, a cradle bottom wall 380, a cradle rear wall 382 and a cradle front wall 384, which are fixedly connected together such that each of the cradles 372 has a generally rectangular, elongate configuration, as shown in FIG. 16. Each of the rams 374 has a thrust rod 386 having a threaded distal end, as designated by the numeral 388 in FIG. 20, which is threadedly connected to a clevis 390.

Each of the cradles 372 also has a front cylinder plate 392 fixedly secured to the cradle top wall 378 and the cradle bottom wall 380, medially between the sides thereof, such that the clevis 390 straddles and is pivotally connected thereto by a first pin 394. A rear cylinder plate 396 is fixedly secured to each of the side rails 331, such as adjacent to the juncture between the side rail 331 and one of the middle support braces 336, as shown in FIG. 18. Each of the rams 374 has a proximal end 398 pivotally connected to a respective one of the rear cylinder plates 396 by a second pin 401. The apparatus needed to operate the rams 374 is readily available and is preferably installed in the compartment 344 with connections and controls as appropriate. Such apparatus can comprise, for example, a hydraulic pump driven by an integral electric motor, which can be powered by a battery. Alternatively, hydraulic pumps are available which are manually operated, and could be employed to drive the piston-and-cylinder units 374.

An elongate cross beam 403 is fixedly secured to the main frame 304 near the front end 313 such that the cross beam 403 extends centrally through each of the cradles 372, as shown in FIG. 22. The cross beam 403 is preferably spaced such that as the thrust rods 386 are in a fully extended configuration, a forward edge 404 of each of the front cylinder plates 392 is in close proximity to the cross beam 403, as shown in FIG. 16. A retainer guide in each end of the cross beam 403, such as a threaded retainer guide or rod 405 in a mated tapped throughbore 406, is spaced from the respective on of the middle support braces 336 such that the cradle top wall 378 and the cradle bottom wall 380 is slidably displaceable fore-and-aft between the respective retainer rod 405 and the respective middle support brace 336.

Each of the retainer rods 405 has sufficient length such that the respective one of the cradles 372 is retained alongside at least one of the respective middle support braces 336 as the vehicle 300 is in a looked transport position, a load/unload position, and all intermediate positions therebetween as hereinafter described.

Each of the transfer rods 376 has a forward end 407 which is secured to a respective one of the cradle rear walls 382, such as by nuts 409 mated with threads 411 as shown in FIG. 20, and a rearward end 413 which is fixedly secured to one of a pair of elongate transfer bars 415. Each of the transfer bars 415 has a distal end 416 pivotally connected to a respective one of the front support braces 358, as shown in FIGS. 13 and 14. A throughslot 418 is provided in each of the front fenders 316 such that the transfer bars 415 are uninterferingly displaceable fore-and-aft therethrough, as hereinafter described.

The locking mechanisms 370 includes an elongate, generally cylindrically shaped locking bar 417 which is rotatably secured in an opposing pair of the middle support braces near the front end 13 of the vehicle 300. The locking bar 417 has sufficient length that each of the end thereof extends outwardly from the cradles 372, such as end 419 as shown in FIG. 17.

Each of the locking mechanisms 370 also includes a locking finger 421, an upper locking member 423, and a lower locking member 425. The locking fingers 421 are fixedly secured to the locking bar 417 such that the locking fingers 421 are spaced outwardly from the respective middle support brace 336 and inwardly from the respective locking bar end 419 such that the locking fingers 421 are spaced within a respective one of the cradles 372. Preferably, the locking fingers 421 each has a length which is shorter than the width of the respective cradle top wall 378 and is cylindrically shaped with co-axial axes generally parallel with the axis of the looking bar 417.

Each of the upper locking members 423 is fixedly secured to the respective cradle top wall 378 and is dimensioned such that as the thrust rods 386 are in their fully extended configuration and each of the cradle top walls 378 rests on the cross beam 403, the locking fingers 421 are spaced downwardly from the locking bar 417 and a rear end 427 of each of the upper locking members 423 is in close proximity to a forward end 429 of the cross beam 403, as shown in FIG. 16. Preferably, the upper locking member 423 extends to and is fixedly secured to the cradle front wall 384.

Each of the lower locking members 425 is fixedly secured to the respective cradle bottom wall 380 and is dimensioned such that as each of the cradle top walls 378 rest on the cross beam 403 and the locking fingers are spaced downwardly from the locking bar 417, an upper edge 431 of each of the lower locking members 425 is in close proximity to a lowermost extremity of the respective locking finger 421, as shown in FIG. 16. Preferably, the lower looking member 425 also extends to and is fixedly secured to the cradle front wall 384.

The cross beam 403, the locking bar 417, and each of the locking fingers 421, the upper locking members 423 and the lower locking members 425 are further dimensioned such that as the locking fingers 421 are spaced upwardly from the locking bar 417, the upper edges 431 of the lower locking members 425 are spaced below the cross beam 403 and a lower edge 433 of each of the upper locking members 423 is elevated relative to the cross beam 403 such that the cradles 372 can be slidably displaced rearwardly relative to the cross beam 403, as shown in FIGS. 20 and 22.

A crank 435 is fixedly secured to the locking bar 417 near the end 419 such that the locking bar 417 can be pivoted in either a clockwise or a counterclockwise direction. A stop 437 is rigidly secured to the locking bar 417 inwardly from One of the sidewalls 347 or 348 and is spaced such that the stop 437 abuts against the rear wall 349 as the locking fingers 421 depend downwardly from the locking bar 417, as shown in FIGS. 17 and 21 (in solid lines), providing a locked configuration for a transport position of the vehicle 300. A releasable detent 436 maintains the crank 435 in a locking configuration.

After rotation of the locking bar 417 clockwise through an angle of approximately 180 degrees, as indicated by the arrow referenced by the numeral 438 in FIG. 21, such that the locking fingers 421 are spaced upwardly from the locking bar 417, the stop 437 again abuts against the rear wall 349, as shown in FIGS. 19 and 21 (in phantom lines), providing an unlocked configuration for the transport position of the vehicle 300, the two extreme positions described for the stop 437 corresponding to the locked and unlocked ramp-up configurations and thereby limiting rotation of the locking bar 417.

Shielding means 440 substantially shields the bed pivoting means 368 for safety purposes. In operation, the vehicle 300 of this invention is used with a towing vehicle, such as a truck or tractor and may be used for transporting large and small equipment. The vehicle 300, which is normally maintained in the ramp-up looked position, as shown in FIG. 13, is placed where it is to be loaded. Then, an operator manually unlocks the locking mechanism 370 by rotating the crank 435 clockwise approximately 180 degrees, preferably until the stop 437 abuts the rear wall 349, causing the locking fingers 421 to urge the upper locking members 423 upwardly, as shown in FIG. 18. Then, the control and driving apparatus (not shown) are activated such that each of the thrust rods 386 is forcibly retracted into their respective ram 374. As the proximal end 398 of each of the rams 374 is fixed relative to the front portion 322 by the respective pins 401, the front cylinder plates 392 and the remainder of the respective cradles 372 secured thereto, are urged rearwardly, as shown in FIG. 20.

As the cradles 372 are urged rearwardly, the respective transfer rods 376 and transfer bars 415 are similarly urged rearwardly. As a result, the transfer bars 415, which are pivotally connected to the front support braces 358, cause the rear portion 324 to pivot about a transverse axis 439, defined by hinge 319, relative to the front portion 322. In addition, the rear portion 324 also pivots about another transverse axis 441, generally defined by the axle 307, such that the rear bed portion 352 is inclined toward the ground in a load/unload position, as shown in FIG. 14.

As the rear portion 324 pivots rearwardly as described, the axle 306 is elevated thereby, generally raising the wheels 308 off the ground. At the load/unload position, a pair of V-shaped gaps 443 open up between the front portion 322 and the rear portion 324. Safety flap means such as a pair of flaps 445 ar secured to the front portion 322 such that the gaps 443 remain covered while the vehicle 300 is in the load/unload position for safety purposes. The rams 374 act as a locking mechanism to retain the rear bed portion 324 in a ramp-down configuration as the vehicle 300 is being loaded and unloaded.

After loading the trailer 300, the controls (not shown) for the rams 374 are reversed such that the respective thrust rods 386 ar forcibly urged forwardly such that the cradles 372 reassume the unlocked ramp-up transport configuration, as shown in FIG. 18. As the cradles 372 assume that position, the transfer rods 376 and the transfer bars 415 are similarly urged forwardly, causing the rear portion 324 to be tilted about the axis 439 relative to the front portion 322 until the rear bed portion 352 assumes a position which is substantially coplanar with the front bed portion 328 as the thrust rods 386 are in their fully extended configurations. The weight of equipment or materials (not shown) loaded on the front portion 322 assists in returning the rear portion 324 to the ramp-up transport position.

For adjusting the alignment of the rear bed portion 352 with the front bed portion 328 in the ramp-up position, the positioning of the transfer rods 376 relative to the respective cradle rear walls 382 can be altered by threadedly advancing the nuts 409 as needed. Also, for adjusting the positioning of the upper locking member rear end 425 relative to the cross beam 403 in the ramp-up position, the clevises 390 can be disconnected from the cylinder plates 392 and the clevises 390 threadedly advanced along the respective threaded distal ends 388 as needed.

The crank 435 is then rotated counter-clockwise approximately 180 degrees, preferably until the stop 437 abuts the rear wall 349, as shown in solid lines in FIG. 21, such that the locking fingers 421 urge the respective lower locking members 425 downwardly, thereby placing the ramping mechanisms 368 in a locked, ramp-up, transport position.

For situations where one of the wheels 308 may need to be removed, the trailer 300 is placed in a load/unload configuration which raises the wheels 308 off the ground. If it is necessary to remove one of the wheels 309, an obstruction (not shown) may be placed under a rearmost corner 447 of the trailer 300 such that further retraction of the thrust rods 386 causes wheels 309 to also be elevated above the ground.

IV. Fourth Embodiment

A fourth embodiment of a hinged bed vehicle in accordance with the present invention is shown in FIGS. 23a through 31 and is generally designated by the reference numeral 450. Many of the characteristics of the vehicle 450 are substantially similar to those previously described for other embodiments described herein and will not be reiterated here in detail.

The vehicle 450 will be described herein as a gooseneck trailer but it is to be understood that the vehicle 450 may also be constructed as part of a vehicle such as a truck bed, a flatbed trailer, or any of a number of other suitable configurations.

The vehicle 450 has a gooseneck 452 for connecting to a fifth wheel (not shown), a front bed portion 454, a rear bed portion 456 and outriggers 458. The front bed portion is connected to an axle 460 having opposing wheels 462. The rear bed portion 456 is similarly connected to a rear axle 464 having opposing wheels 466.

The front bed portion 454 has a frame 468 comprising a pair of opposing side members 470 rigidly connected to a rear member 472.

The rear bed portion 456 has a rear bed frame 473 which comprises a pair of opposing side members 474 rigidly connected to a front member 476 and a cross member 478.

The rear member 472 of the front bed portion 454 and the front member 476 of the rear bed portion 456 are connected to a hinge 480 such that the rear bed portion is pivoted about an axis 482 relative to the front bed portion 454.

A transversely oriented rook shaft 484 is pivotally connected to the side members 470 as shown in FIG. 24. A pair of cam plates or rocker brackets 486 are rigidly secured to the rock shaft 484 such that the rocker brackets 486 project radially therefrom. Each of the rocker brackets 486 is generally L-shaped, having a brace leg 488 and a ram leg 490. A pair of rear brackets 492 are rigidly connected to the cross member 478 as shown in FIGS. 24 and 25.

Each of a pair of piston and cylinder units or rams 494 has a distal end 496 pivotally connected to a respective one of the rear brackets 492 and a thrust rod 498 pivotally connected to a respective one of the ram legs 490 such as by a clevis 501 as shown in FIGS. 24 and 25.

A brace or linkage bar 503 is similarly pivotally connected to each one of the rear brackets 492 and to each one of the brace legs 488 such that one of the linkage bars 503 is associated with a different one of the cylinders 494.

As the rams 494 are in their fully extended position, as shown in FIG. 25, pivot axes 505 and 507 of each of the link bars 503 are substantially collinear with axis 509 of the rock shaft 484, which corresponds with a ramp-up transport position of the vehicle 450.

A transversely oriented locking shaft 511 is pivotally connected between the side members 470. An elongate looking finger 513 is rigidly secured to the looking shaft 511 such that the locking finger 513 extends radially outward therefrom. As the bed pivoting mechanism 515 is in the ramp-up position, the locking finger 513 cooperates with a notch 517 in each of the rocker brackets 486 as shown in FIG. 25. A spring 519 is connected to the locking finger 513 such that the locking finger 513 seeks the notches 517 as the bed pivoting mechanism 515 assumes the ramp-up configuration automatically locking the vehicle 450 in that position.

Disengagement means, such as a disengagement lever 535 in conjunction with disengagement linkage 537 provide means for disengaging the locking finger 513 from the notches 517. The disengagement lever 535 is pivotally connected about a transverse axis between the side members 470. The disengagement linkage 537 has a first end 539 pivotally connected to the disengagement lever 535 and a second end 541 pivotally connected to the locking finger 513, as shown in FIG. 29, whereat the disengagement means is shown in a locking configuration.

Linear motor operating means, such as a control knob 543 which, when pushed inwardly, causes the rams 494 to retract thereby placing the vehicle 450 in a load/unload position and, when pulled outwardly, causes the rams 494 to extend thereby placing the vehicle 450 in a transport position, as hereinafter described, is located behind the disengagement lever 535 such that access to the knob 450 is normally prevented.

By rotating the disengagement lever 535 downwardly, the knob 450 is exposed and the disengagement means is placed in a disengaged configuration, as shown in FIG. 30. The knob 450 is generally mechanically connected to a readily available hydraulic power source 545 and control mechanism 547 normally housed in an openable, enclosed compartment 549, as shown in FIG. 28. As the knob 450 is pulled or pushed as desired, the power source 545 is automatically started. As the disengagement lever 535 is released, the knob 450 is again covered for safety purposes.

Each of the side members 474 has a forward edge 521 which is tapered downwardly and rearwardly from the hinge 480 as shown in FIG. 25. A front bed 523 is secured to the front bed frame 468 and a rear bed 525 is secured to the rear bed frame 473.

In preparation for loading the vehicle 450, the locking shaft 511 is rotated such that the locking finger 513 is disengaged from the notches 517, as indicated by the phantom lines designated by the numeral 527 in FIG. 25. The rams 494 are then caused to retract their respective thrust rods 498. As a result, the rocker brackets 486 are caused to rotate about the axis 509 which, in conjunction with the linkage bars 503, causes the rear bed portion 456 to assume a downwardly directed position as shown by the phantom lines designated by the numeral 529 in FIG. 23b, which constitutes a ramp-down configuration for the vehicle 450.

As the rear bed portion 456 assumes the position 529, the wheels 462 are generally elevated above the ground and the bed pivoting mechanism 515 assumes the configuration shown in FIG. 26. The rams 494 act as a locking mechanism to retain the rear bed portion 456 in a ramp-down configuration as the vehicle 450 is being loaded and unloaded.

After loading the vehicle 450, the thrust of the cylinders 494 is reversed such that the rods 498 are extended forwardly, thereby rotating the rocker brackets 486 counter-clockwise (as viewed in FIG. 25) about the axis 509 such that the rear bed portion 456 is returned to a ramp-up transport configuration. The weight of equipment or materials (not shown) loaded on the front bed portion 454 assists in returning the rear bed portion 456 to the ramp-up transport position.

The side members 474 are generally tapered upwardly at a rearmost extremity of the rear bed portion 456 as indicated by the numeral 531 in FIG. 23b.

It is to be understood that while certain forms of the present invention have been illustrated and described herein, it is not to be limited to the specific forms or arrangement of parts described and shown.

What is claimed and desired to be secured by Letters Patent is as follows:

1. A vehicle for receiving a load comprising:
   (a) a bed having a front portion and a rear portion;
   (b) wheel means supporting said bed;
   (c) hinge means pivotally connecting said front portion to said rear portion; said rear portion being pivotal between a load/unload position inclined downwardly and rearwardly from said front portion and a transport position with said bed portions generally horizontally aligned; said front portion remaining generally horizontal when said rear portion is in said load/unload position;
   (d) bed pivoting means having a first end connected to said front portion and a second end connected to said rear portion such that said rear portion is selectively pivotable from one to the other of said transport position and said load/unload position;
   (e) first locking means for securing said rear portion in said transport position; and in said transport position; and
   (f) second locking means for securing said rear portion in said load/unload position.

2. The invention of claim 1 wherein said bed pivoting means includes:

(a) linear motor means having first and second ends and having an extended position associated with one of said rear portion positions and a retracted position associated with the other of said rear portion positions.

3. The invention of claim 2 wherein:
(a) said linear motor means comprises a hydraulic piston-and-cylinder unit.

4. The invention according to claim 3 wherein said second locking means is provided by said piston-and-cylinder unit.

5. The invention of claim 3, which includes:
(a) a transverse, generally horizontal, bed pivotal axis extending through said hinge means; and
(b) said piston-and-cylinder unit being located generally below said bed pivotal axis.

6. The invention of claim 3, which includes:
(a) a generally horizontal, transverse pivotal axis extending through said hinge means; and
(b) said piston-and-cylinder unit being located generally above said bed pivotal axis.

7. The invention according to claim 3 including:
(a) an enclosed compartment for containing hydraulic power source means for said piston-and-cylinder unit.

8. The invention of claim 2, which includes:
(a) a rock shaft rotatably mounted on said front portion and rotatable with respect thereto about a transverse rotational axis;
(b) a cam plate fixedly mounted on said rock shaft and having first and second ends;
(c) said cam plate first end being connected to said linear motor means first end; and
(d) a linkage bar having a first end pivotally connected to said cam plate second end and a second end connected to said rear portion.

9. The invention according to claim 2, including:
(a) a rear cylinder plate rigidly secured to said front portion; said rear cylinder plate pivotally connected to said second end of said linear motor means; and
(b) a front cylinder plate pivotally connected to said first end of said linear motor means; said front cylinder plate pivotally connected to said rear portion; said front cylinder plate positioned by said linear motor means at a first position as said rear portion is in said transport position, and said front cylinder plate is displaced rearwardly by said linear motor means to a second position nearer said rear cylinder plate as said rear portion is in said load-/unload position.

10. The invention according to claim 1 wherein said first locking means includes:
(a) a transversely oriented cross beam having a forward end;
(b) an upper locking member;
(c) a lower locking member; said lower locking member fixed relative to said upper locking member and spaced therefrom such that said cross beam is slidably displaceable therebetween; and
(d) a locking bar mounted on said front portion and rotatable with respect thereto about a transverse rotational axis; said locking bar having a finger such that as said locking bar assumes a first, locked configuration, said upper locking member abuts said forward end of said cross beam and as said locking bar assumes a second, unlocked configuration, said cross beam is slidable between said upper locking member and said lower locking member.

11. The invention according to claim 10, including:
(a) a stop connected to said locking bar such that the rotation of said locking bar about said transverse axis is limited to approximately 180 degrees.

12. The invention according to claim 1 wherein said first locking means include:
(a) a notch formed in said cam plate;
(b) a locking shaft mounted on said front portion and rotatable with respect thereto about a transverse rotational axis; and
(c) a locking finger fixedly secured to said locking shaft and extending radially outward therefrom; said locking finger cooperating with said notch to releasably lock said vehicle in said transport position.

13. The invention according to claim 12, including:
(a) a spring for biasing said locking finger into said notch.

14. The invention according to claim 13, including:
(a) disengagement means including disengagement linkage means for disengaging said locking finger from said notch; said disengagement means normally biased in a locking configuration by said spring; said disengagement linkage means preventing operation of said linear motor operating means while in said locking configuration.

15. The invention according to claim 1 including:
(a) safety flap means for covering spacing between said rear portion and said front portion as said rear portion is pivoted rearwardly from said front portion.

16. The invention according to claim 1, including:
(a) shield means for substantially shielding said bed pivoting means for safety purposes.

17. The invention according to claim 1, including:
(a) a first generally horizontal, transverse pivotal axis extending through said hinge means; and
(b) an axle having a pair of opposing wheels; said axle providing a second generally horizontal, transverse pivotal axis therethrough; said second axis spaced rearwardly from said first axis; said first axis displaced upwardly relative to said second axis as said vehicle is in a load/unload position such that the load assists in returning said rear portion from said load/unload position to said transport position.

18. A vehicle for receiving a load comprising:
(a) a bed having a front portion and a rear portion;
(b) wheel means supporting said bed;
(c) hinge means pivotally connecting said front portion to said rear portion; said rear portion being pivotal between a load/unload position inclined downwardly and rearwardly from said front portion and a transport position with said bed portions generally horizontally aligned; said front portion remaining generally horizontal when said rear portion is in said load/unload position;
(d) bed pivoting means having a first end connected to said front portion and a second end connected to said rear portion such that said rear portion is selectively pivotable from one to the other of said transport position and said load/unload position;
(e) linear motor means having first and second ends and having an extended position associated with one of said rear portion positions and a retracted positions associated with the other of said rear portion positions;

(f) a rock shaft rotatably mounted on said front portion and rotatable with respect thereto about a transverse rotational axis;
(g) a cam plate fixedly mounted on said rock shaft and having first and second ends;
(h) said cam plate first end being connected to said linear motor means first end; and
(i) a linkage bar having a first end pivotally connected to said cam plate second end and a second end connected to said rear portion.

19. The invention of claim 18, which includes:
(a) a rear bracket mounted on said rear portion and having upper and lower ends;
(b) said linear motor means second end being pivotally connected to said rear bracket upper end; and
(c) said linkage bar second end being pivotally connected to said rear bracket lower end at a fixed spacing from said pivotal connection of said linkage bar first end.

20. The invention of claim 18 which includes:
(a) said rock shaft rotational axis, said pivotal connection between said link bar first end and said cam plate second end, and said pivotal connection said link bar second end and said rear bracket lower end being generally horizontally aligned with said bed rear portion in its transport position.

21. A vehicle for receiving a load comprising:
(a) a bed having a front portion and a rear portion;
(b) wheel means supporting said bed;
(c) hinge means pivotally connecting said front portion to said rear portion; said rear portion being pivotal between a load/unload position inclined downwardly and rearwardly from said front portion and a transport position with said bed portions generally horizontally aligned; said front portion remaining generally horizontal when said rear portion is in said load/unload position;
(d) bed pivoting means having a first end connected to said front portion and a second end connected to said rear portion such that said rear portion is selectively pivotable from one to the other of said transport position and said load/unload position;
(e) a hydraulic piston-and-cylinder unit having first and second ends and having an extended position associated with one of said rear portion positions and a retracted position associated with the other of said rear portion positions; and
(f) an enclosed compartment for containing hydraulic power source means for said piston-and-cylinder unit.

22. A vehicle for receiving a load comprising:
(a) a bed having a front portion and a rear portion;
(b) wheel means supporting said bed;
(c) hinge means pivotally connecting said front portion to said rear portion; said rear portion being pivotal between a load/unload position inclined downwardly and rearwardly from said front portion and a transport position with said bed portions generally horizontally aligned; said front portion remaining generally horizontal when said rear portion is in said load/unload position;
(d) bed pivoting means having a first end connected to said front portion and a second end connected to said rear portion such that said rear portion is selectively pivotable from one to the other of said transport position and said load/unload position; and
(e) safety flap means for covering spacing between said rear portion and said front portion as said rear portion is pivoted rearwardly from said front portion.

23. A vehicle for receiving a load comprising:
(a) a bed having a front portion and a rear portion;
(b) wheel means supporting said bed;
(c) hinge means pivotally connecting said front portion to said rear portion; said rear portion being pivotal between a load/unload position inclined downwardly and rearwardly from said front portion and a transport position with said bed portions generally horizontally aligned; said front portion remaining generally horizontal when said rear portion is in said load/unload position; and
(d) shield means for substantially shielding said bed pivoting means for safety purposes.

24. A vehicle for receiving a load comprising:
(a) a bed having a front portion and a rear portion;
(b) wheel means supporting said bed;
(c) hinge means pivotally connecting said front portion to said rear portion; said rear portion being pivotal between a load/unload position inclined downwardly and rearwardly from said front portion and a transport position with said bed portions generally horizontally aligned; said front portion remaining generally horizontal when said rear portion is in said load/unload position;
(d) a first generally horizontal, transverse pivotal axis extending through said hinge means; and
(e) an axle having a pair of opposing wheels; said axle providing a second generally horizontal, transverse pivotal axis therethrough; said second axis spaced rearwardly from said first axis; said first axis displaced upwardly relative to said second axis as said vehicle is in a load/unload position such that the load assists in returning said rear portion from said load/unload position to said transport position.

* * * * *